Oct. 21, 1958  P. L. KNIGHT  2,857,153
WATER SEALING FURNACE SECTION
Filed Oct. 4, 1954

INVENTOR.
PHILIP L. KNIGHT
BY Charles A. Haughey
his attorney

United States Patent Office 2,857,153
Patented Oct. 21, 1958

2,857,153
WATER SEALING FURNACE SECTION

Philip L. Knight, Toledo, Ohio, assignor to Surface Combustion Corporation, Toledo, Ohio, a corporation of Ohio Application October 4, 1954, Serial No. 460,019

6 Claims. (Cl. 266—4)

In continuous roller hearth furnaces for heat treating tubes, rods and the like it is desirable to maintain, within the heating chamber, an atmosphere, such as may be formed by the products of combustion from burners which heat the chamber. It is customary to provide a restricted inlet and outlet for the furnace to conserve the atmosphere in the chamber. With varying production conditions and work travel through the furnace it is quite difficult to maintain a good atmosphere seal at either end of this furnace. When the heat treatment requires a cooling or quenching operation after the heating, liquid coolant may be utilized in assisting in the maintenance of an atmosphere seal at the discharge end of the furnace.

This invention relates to a particular atmosphere seal formed by a falling curtain of liquid coolant, hereinafter referred to as water, from the roof of a cooling chamber for the furnace and by an upwardly discharging stream of water from the bottom of the furnace chamber in such a manner that the two streams meet and form between the work passing through the furnace a substantially continuous gas seal.

For a consideration of what I believe to be novel and my invention, attention is directed to the following portion of this specification and the drawings and claims thereof.

Figure 1:
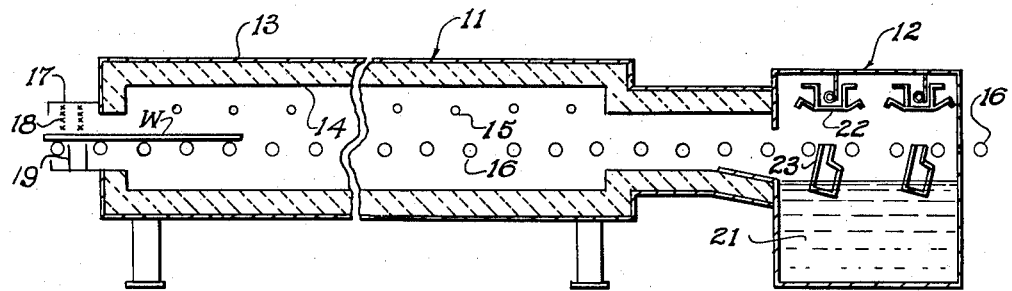
Figure 1 is a somewhat schematic vertical longitudinal sectional view of a furnace according to the present invention.

The roller hearth furnace shown in the drawings comprises a heating section 11 and a cooling section 12 through which tubes, rods and the like may be passed for heating and subsequent quenching. The furnace comprises a metal casing 13 and a refractory lining 14 in the heating section and the longitudinally extending series of rollers 16 for conveying work such as tubes W into and through the heating section and on into and through the cooling section 12.

Heat may be supplied to the heating section by direct fired burners 15 whose products of combustion may provide an atmosphere for the heating chamber. To conserve this furnace atmosphere, an entrance sealing vestibule 17 at the entrance end of the furnace, is provided with gas flow restricting means such as hanging asbestos curtains 18, and upstanding baffles 19.

Figure 2:
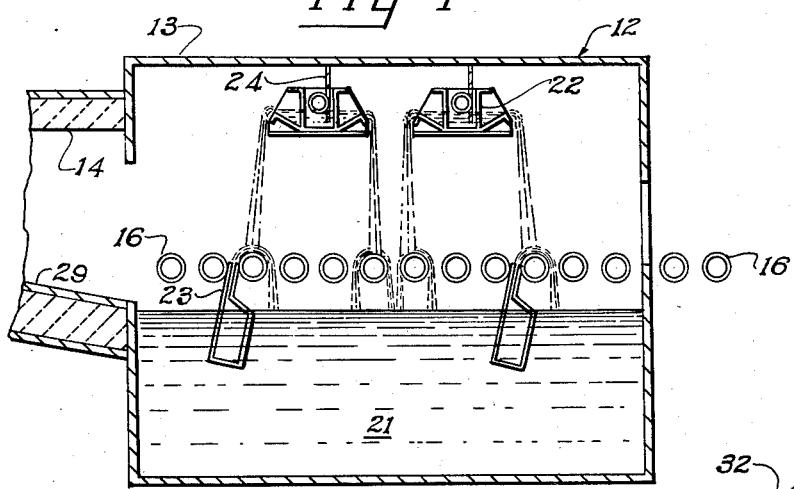
Figure 2 is an enlarged view of the cooling section of the furnace of Figure 1.

In the cooling zone of the furnace continuous sheets of water flow down over the work to cool the work as it is discharged from the furnace and to help in providing an atmosphere seal for the heating chamber in the furnace. Water is drawn from a sump 21 in the cooling chamber and is delivered by a pump, not shown, to a water curtain trough structure 22 at the top of the cooling chamber and to water curtain nozzles 23 under the rollers 16 in the chamber. The water curtain nozzles extend down into the sump to provide a gas seal between the nozzles and the surface of the water in the sump, and seal plates 24 extend from the roof of the cooling section 12 into the troughs 22. Similar sheets may extend from the side walls into the water stream as desired. A continuous sheet of water flows over the weir 28 of the water curtain trough structure and down over the work being passed through the cooling chamber. It is characteristic of such flow of water that the water tends to point towards the work which interrupts its flow thereby opening a gap between and under tubes passing through the chamber on the rollers 16. The water curtain nozzles 23 below the rollers deliver a rising curtain of water which is designed to fill these gaps, and to form with the falling curtain of water a continuous sheet of water vertically across the cooling chamber. This water curtain nozzle, sometimes called an upside down weir, will produce a continuous upward sheet of water 3 to 4 inches high through a slot width of 0.027 inch with 1 foot of water pressure. This sheet of water may be depressed by the falling sheet of water as shown in Fig. 2 when no work is passing through this water screen.

The overhead water curtain trough structure forms a central water supply channel and side weirs for discharge of sheets of water formed by plates 28, the side weirs receiving water through apertures 27 in the walls of trough 25. Such water as splashes or runs on work toward the heating zone will be returned to the sump by the drain plate 29.

Figure 4:
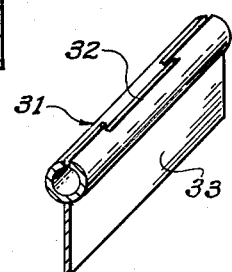
Figure 4 shows an alternate elongated water curtain nozzle for the cooling chamber of the furnace of Figures 1 and 2.
Figure 3:
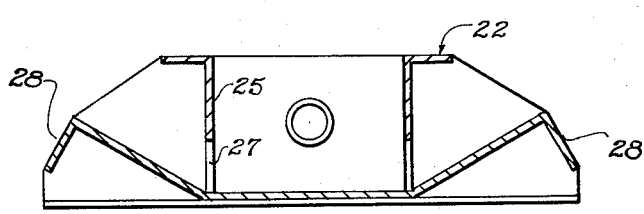
Figure 3 is a cross section view of an overhead weir in the cooling section of the furnace of Figure 1.

One form of the water curtain nozzle is shown in Figure 1 where the nozzle comprises a water plenum in the bottom portion thereof with an unwardly directed nozzle constituting a water curtain nozzle 23. An alternate water curtain nozzle structure is illustrated in Figure 4 where an elongated pipe 31 is provided with a longitudinal series of slots 32 formed in the top of the pipe, the slots being relatively narrow and long and overlapping each other at their ends, and a depending sheet of steel 33 from the bottom of the pipe which extends downward into the water sump in the cooling chamber to form with the water a gas seal.

It is common practice to provide water cooling sections for roller hearth furnaces wherein water is sprayed upwards under the work to cool it, requiring high water pressures of about 35 p. s. i. to operate the nozzles. Such spray nozzles require considerable maintenance to avoid plugging of the nozzles, and the pumping costs are considerable.

In this invention, water may be pumped at much lower pressures, depending upon the distance from the nozzle 23 to the work, a pressure of about one foot water column, or less than ½ p. s. i. being sufficient to produce a 3 to 4 inch sheet of water from the nozzle 23. It is thus economical to use the same low pressure water pump to deliver water to the overhead weir that is used to supply water to the nozzle 23.

Since the volume of water used to form the vertical sheet of water which seals off the cooling chamber will ordinarily be determined by the volume required to cool work passing through the chamber, and thus need be no greater than the volume formerly delivered through spray nozzles, it will be appreciated that this invention provides a less expensive unit to operate as well as less expensive to build and more effective in gas sealing.

I claim:

1. Structure forming a water cooling and atmosphere sealing chamber for a furnace, comprising the combination of a casing forming a cooling chamber wherethrough work to be cooled is passed in a substantially horizontal direction, and forming a water sump in the bottom of the chamber; weir means in gas sealing relation to the roof of said chamber for delivering from above the path of the work a substantially continuous sheet of water transversely across the chamber and the path of travel; and nozzle means in gas sealing relation to the bottom of said chamber for delivering from below the path aforesaid a substantially continuous sheet of water upwardly to intersect the first mentioned sheet of water, whereby to form a continuous gas seal across said chamber, the portions of which next adjacent the path of work travel are formed of water.

2. Roller hearth furnace structure comprising a casing forming a cooling zone for the furnace, and forming in the bottom of said casing a sump for water; a series of rollers for conveying work along a path of travel through the cooling zone; weir structure above the path in gas sealing relation to the roof of said casing for delivering a substantially continuous sheet of water transversely of the zone and across the path from side to side of the zone, and forming with said water sheet a gas seal for the upper portion of the zone; and nozzle structure below the path in gas sealing relation to the bottom of said casing for delivering a second substantially continuous sheet of water transversely of the zone and across the path from side to side of the zone, and forming with said second sheet of water a gas seal for the lower portion of the zone, said first and second sheets of water intersecting to form therebetween a gas seal across said path.

3. Apparatus according to claim 1 wherein said nozzle structure comprises an elongate pipe having a longitudinal series of slots formed therein, said slots being relatively narrow and overlapping at their ends whereby to form a substantially continuous sheet of water therefrom.

4. The method of forming a substantially continuous screen of liquid across the cooling zone of a furnace which comprises delivering a first sheet of liquid over a weir from the top of the zone, continuously across the zone; and delivering a second sheet of liquid from an elongate nozzle on the bottom of the zone upwardly to intersect with the first sheet of liquid and form therewith a substantially continuous screen of liquid across the cooling zone.

5. Structure forming a water cooling and atmosphere sealing chamber for a furnace, comprising the combination of a casing forming a cooling chamber wherethrough work to be cooled is passed, and forming a water sump in the bottom of the chamber; weir means in gas sealing relation to the roof of such chamber for delivering from above the path of the work a substantially continuous sheet of water transversely across the chamber and the path of travel; and nozzle means comprising an elongate pipe extending transversely across said chamber below said path of travel, having a longitudinal series of slots therein, said slots being relatively narrow and overlapping at their ends whereby to form a substantially continuous sheet of water therefrom, and having a metal sheet attached to the pipe and adapted to dip into the water sump to form therewith a gas seal between the pipe and the sump, whereby to form a substantially continuous gas seal across said chamber, the portion of which next adjacent the path of work travel are formed of water.

6. Roller hearth furnace structure comprising a casing forming a cooling zone for a furnace, and forming in the bottom of said casing a sump for water; a series of rollers for conveying work along a path of travel through the cooling zone; weir structure in gas sealing relation to the roof of said casing for delivering from above the path of the work a falling curtain of water transversely across said zone and path of travel; and nozzle means aligned with said weir in gas sealing relation to the bottom of said casing for delivering from below the path of the work a substantially gas tight barrier of water toward said roller transversely across said zone and path of travel, whereby a substantially continuous gas seal across said zone is formed.

References Cited in the file of this patent

UNITED STATES PATENTS

| | | |
|---|---|---|
| 1,170,989 | Orvis | Feb. 8, 1916 |
| 1,536,650 | Betcher | May 5, 1925 |
| 1,709,160 | Tinker | Apr. 16, 1929 |
| 2,063,784 | Bechtel et al. | Dec. 8, 1936 |
| 2,064,532 | Gilbert | Dec. 15, 1936 |
| 2,126,534 | Cope | Aug. 9, 1938 |

FOREIGN PATENTS

| | | |
|---|---|---|
| 470,330 | Great Britain | Aug. 12, 1937 |
| 157,880 | Switzerland | Jan. 2, 1933 |